US008600115B2

(12) United States Patent
Liu

(10) Patent No.: US 8,600,115 B2
(45) Date of Patent: Dec. 3, 2013

(54) BOREHOLE IMAGE RECONSTRUCTION USING INVERSION AND TOOL SPATIAL SENSITIVITY FUNCTIONS

(75) Inventor: Zhipeng Liu, Katy, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 129 days.

(21) Appl. No.: 13/157,505

(22) Filed: Jun. 10, 2011

(65) Prior Publication Data

US 2011/0305371 A1 Dec. 15, 2011

Related U.S. Application Data

(60) Provisional application No. 61/353,289, filed on Jun. 10, 2010.

(51) Int. Cl.
| | | |
|---|---|---|
| G06K 9/00 | (2006.01) | |
| E21B 47/022 | (2012.01) | |
| G01V 3/18 | (2006.01) | |
| G01V 3/00 | (2006.01) | |

(52) U.S. Cl.
USPC .............. 382/107; 33/304; 324/324; 324/338

(58) Field of Classification Search
USPC .............. 382/100, 109; 348/85; 33/302, 304, 33/311, 342, 544; 73/152.01, 152.02, 73/152.03, 152.04, 152.17; 702/6
See application file for complete search history.

(56) References Cited

U.S. PATENT DOCUMENTS

| | | |
|---|---|---|
| 3,305,771 A | 2/1967 | Arps |
| 3,377,549 A | 4/1968 | Newman et al. |
| 3,408,561 A | 10/1968 | Redwine et al. |
| 3,488,574 A | 1/1970 | Tanguy |
| 4,468,623 A | 8/1984 | Gianzero et al. |
| 4,542,648 A | 9/1985 | Vinegar et al. |
| 4,562,556 A | 12/1985 | Ingram et al. |
| 4,642,648 A | 2/1987 | Hulland et al. |
| 4,652,829 A | 3/1987 | Safinya |
| 4,720,681 A | 1/1988 | Sinclair |
| 4,766,442 A | 8/1988 | Issenmann |
| 4,786,874 A | 11/1988 | Grosso et al. |
| 4,845,433 A | 7/1989 | Kleinberg et al. |
| 4,873,488 A | 10/1989 | Barber et al. |
| 4,940,943 A | 7/1990 | Bartel et al. |
| 5,023,450 A | 6/1991 | Gold |

(Continued)

FOREIGN PATENT DOCUMENTS

| | | |
|---|---|---|
| EP | 0084001 B1 | 3/1991 |
| EP | 0981062 A2 | 2/2000 |
| EP | 0793000 | 4/2001 |
| EP | 0663511 B1 | 7/2002 |
| GB | 2301438 | 4/1996 |
| GB | 2402489 A | 8/2004 |
| GB | 2411729 A | 9/2005 |
| GB | 2415049 A | 12/2005 |
| GB | 2416038 A | 1/2006 |

OTHER PUBLICATIONS

Oppenheim, A. V. and Schafer, R.W., "Digital Signal Processing", Prentice-Hall, 1975, pp. 239-250 and pp. 548-554.

(Continued)

*Primary Examiner* — Abolfazl Tabatabai
(74) *Attorney, Agent, or Firm* — Kimberly Ballew; Christopher Streinz

(57) ABSTRACT

A method for reconstructing a borehole image includes determining a spatial sensitivity function for a borehole imaging tool and using the imaging tool to obtain a borehole image of a subterranean formation. A reconstructed image is then computed from the borehole image and the spatial sensitivity function.

20 Claims, 5 Drawing Sheets

(56) References Cited

U.S. PATENT DOCUMENTS

| | | |
|---|---|---|
| 5,045,795 A | 9/1991 | Gianzero et al. |
| 5,184,079 A | 2/1993 | Barber .................. 324/339 |
| 5,200,705 A | 4/1993 | Clark et al. |
| 5,233,522 A | 8/1993 | Sinclair |
| 5,235,285 A | 8/1993 | Clark et al. |
| 5,260,662 A | 11/1993 | Rorden |
| 5,291,137 A | 3/1994 | Freedman |
| 5,331,331 A | 7/1994 | Wu |
| 5,339,036 A | 8/1994 | Clark et al. |
| 5,339,037 A | 8/1994 | Bonner et al. |
| 5,357,797 A | 10/1994 | Maki, Jr. et al. |
| 5,359,324 A | 10/1994 | Clark et al. |
| 5,381,092 A | 1/1995 | Freedman |
| 5,422,480 A | 6/1995 | Schultz |
| 5,453,693 A | 9/1995 | Sinclair et al. |
| 5,461,562 A | 10/1995 | Tabanou et al. |
| 5,463,319 A | 10/1995 | Chesnutt et al. |
| 5,463,320 A | 10/1995 | Bonner et al. |
| 5,467,832 A | 11/1995 | Orban et al. |
| 5,473,158 A | 12/1995 | Holenka et al. |
| 5,486,695 A | 1/1996 | Schultz et al. |
| 5,491,488 A | 2/1996 | Wu |
| 5,506,769 A | 4/1996 | Fu et al. |
| 5,513,528 A | 5/1996 | Holenka et al. |
| 5,519,318 A | 5/1996 | Koerner et al. |
| 5,519,668 A | 5/1996 | Montaron |
| 5,530,358 A | 6/1996 | Wisler et al. |
| 5,563,512 A | 10/1996 | Mumby |
| 5,591,967 A | 1/1997 | Moake |
| 5,661,402 A | 8/1997 | Chesnutt et al. |
| 5,672,867 A | 9/1997 | Gadeken et al. |
| 5,675,488 A | 10/1997 | McElhinney |
| 5,680,906 A | 10/1997 | Andrieux et al. |
| 5,850,624 A | 12/1998 | Gard et al. |
| 5,867,806 A | 2/1999 | Strickland et al. |
| 5,892,460 A | 4/1999 | Jerabek et al. |
| 5,899,958 A | 5/1999 | Dowell et al. |
| 5,953,683 A | 9/1999 | Hansen et al. |
| 5,966,013 A | 10/1999 | Hagiwara |
| 6,023,168 A | 2/2000 | Minerbo |
| 6,023,658 A | 2/2000 | Jeffryes |
| 6,037,776 A | 3/2000 | McGlone |
| 6,064,210 A | 5/2000 | Sinclair |
| 6,100,696 A | 8/2000 | Sinclair |
| 6,131,694 A | 10/2000 | Robbins et al. |
| 6,166,539 A | 12/2000 | Dahlberg et al. |
| 6,167,348 A | 12/2000 | Cannon |
| 6,173,793 B1 | 1/2001 | Thompson et al. |
| 6,215,120 B1 | 4/2001 | Gadeken et al. |
| 6,307,199 B1 | 10/2001 | Edwards et al. |
| 6,321,456 B1 | 11/2001 | McElhinney |
| 6,326,784 B1 | 12/2001 | Ganesan et al. .............. 324/303 |
| 6,406,136 B1 | 6/2002 | Fries et al. |
| 6,446,736 B1 | 9/2002 | Kruspe et al. |
| 6,476,609 B1 | 11/2002 | Bittar |
| 6,509,738 B1 | 1/2003 | Minerbo et al. |
| 6,510,105 B1 | 1/2003 | Ten Kroode et al. |
| 6,510,106 B2 | 1/2003 | Hudson |
| 6,564,883 B2 | 5/2003 | Fredericks et al. |
| 6,584,837 B2 | 7/2003 | Kurkoski |
| 6,619,395 B2 | 9/2003 | Spross |
| 6,637,524 B2 | 10/2003 | Kruspe et al. |
| 6,693,430 B2 | 2/2004 | Rosthal et al. |
| 6,696,684 B2 | 2/2004 | Radtke et al. |
| 6,704,436 B1 | 3/2004 | Anxionnaz et al. |
| 6,710,601 B2 | 3/2004 | Rosthal et al. |
| 6,714,014 B2 * | 3/2004 | Evans et al. ............... 324/374 |
| 6,715,550 B2 | 4/2004 | Vinegar et al. |
| 6,717,404 B2 | 4/2004 | Prammer |
| 6,724,192 B1 | 4/2004 | McGlone |
| 6,741,185 B2 | 5/2004 | Shi et al. |
| 6,747,569 B2 | 6/2004 | Hill et al. |
| 6,758,277 B2 | 7/2004 | Vinegar et al. |
| 6,768,957 B2 | 7/2004 | Kato |
| 6,774,628 B2 | 8/2004 | Ganesan |
| 6,816,788 B2 | 11/2004 | Van Steenwyk et al. |
| 6,819,111 B2 | 11/2004 | Fanini et al. |
| 6,826,842 B2 | 12/2004 | Abe et al. |
| 6,833,706 B2 | 12/2004 | Niina |
| 6,843,318 B2 | 1/2005 | Yarbro |
| 6,891,777 B2 * | 5/2005 | Pabon et al. .................... 367/27 |
| 6,911,824 B2 | 6/2005 | Bittar |
| 6,944,548 B2 | 9/2005 | Radtke et al. |
| 6,957,145 B2 | 10/2005 | Spross |
| 6,969,994 B2 | 11/2005 | Minerbo et al. |
| 7,019,528 B2 | 3/2006 | Bittar |
| 7,027,926 B2 | 4/2006 | Haugland |
| 7,057,392 B2 | 6/2006 | Wang et al. |
| 7,103,982 B2 | 9/2006 | Haugland |
| 7,138,803 B2 | 11/2006 | Bittar |
| 7,143,521 B2 * | 12/2006 | Haugland ................. 33/304 |
| 7,202,670 B2 | 4/2007 | Omeragic et al. |
| 7,250,768 B2 | 7/2007 | Ritter et al. |
| 7,265,552 B2 | 9/2007 | Bittar |
| 7,375,530 B2 | 5/2008 | Chemali et al. |
| 7,382,135 B2 | 6/2008 | Li et al. |
| 7,403,857 B2 | 7/2008 | Haugland |
| 7,414,405 B2 | 8/2008 | Moore |
| 7,414,407 B2 | 8/2008 | Wang et al. |
| 8,271,199 B2 * | 9/2012 | Wang .................. 702/9 |
| 2002/0062992 A1 | 5/2002 | Fredericks et al. |
| 2002/0105332 A1 | 8/2002 | Rosthal et al. |
| 2002/0108784 A1 | 8/2002 | Kruspe et al. |
| 2003/0042016 A1 | 3/2003 | Vinegar et al. |
| 2003/0048697 A1 | 3/2003 | Hirsch et al. |
| 2003/0066671 A1 | 4/2003 | Vinegar et al. |
| 2003/0146751 A1 | 8/2003 | Rosthal et al. |
| 2003/0146753 A1 | 8/2003 | Rosthal et al. |
| 2003/0155924 A1 | 8/2003 | Rosthal et al. |
| 2003/0184299 A1 | 10/2003 | Strack |
| 2003/0184303 A1 | 10/2003 | Homan et al. |
| 2003/0227393 A1 | 12/2003 | Vinegar et al. |
| 2004/0079524 A1 | 4/2004 | Bass et al. |
| 2004/0079526 A1 | 4/2004 | Cairns et al. |
| 2004/0089475 A1 | 5/2004 | Kruspe et al. |
| 2004/0144530 A1 | 7/2004 | Bass et al. |
| 2004/0222019 A1 | 11/2004 | Estes et al. |
| 2005/0140373 A1 | 6/2005 | Li et al. |
| 2005/0189947 A1 | 9/2005 | Haugland |
| 2005/0234647 A1 | 10/2005 | Haugland |
| 2006/0179627 A1 | 8/2006 | Sakai et al. |
| 2008/0290873 A1 | 11/2008 | Homan |
| 2008/0307875 A1 | 12/2008 | Hassan et al. |
| 2009/0015261 A1 | 1/2009 | Yang et al. |
| 2009/0030616 A1 | 1/2009 | Sugiura |
| 2010/0286916 A1 * | 11/2010 | Wang .................. 702/9 |

OTHER PUBLICATIONS

Jan, Yih-Min and Harrell, John W., "MWD Directional-Focused Gamma Ray—A New Tool for Formation Evaluation and Drilling Control in Horizontal Wells," SPWLA Twenty-Eighth Annual Logging Symposium, Jun. 29-Jul. 2, 1987, Paper A.

Liu, Zhipeng, et al. "Joint Inversion of Density and Resistivity Logs for the Improved Petrophysical Assessment of Thinly-Bedded Clastic Rock Formations," SPWLA 48th Annual Logging Symposium, Austin, TX Jun. 3-6, 2007.

Mendoza, A, et al., "Rapid Simulation of Borehole Nuclear Measurements With Approximate Spatial Flux-Scattering Functions," SPWLA 48th Annual Loggin gSymposium, Jun. 3-6, 2007.

Mendoza, et al., "Inversion of Sector-Based LWD Density Measurements Acquired in Laminated Sequences Penetrated by Highangle and Horizontal Wells", SPWLA 50th Annual Logging Symposium, The Woodlands, Texas, Jun. 21-24, 2009, 16 pages.

* cited by examiner

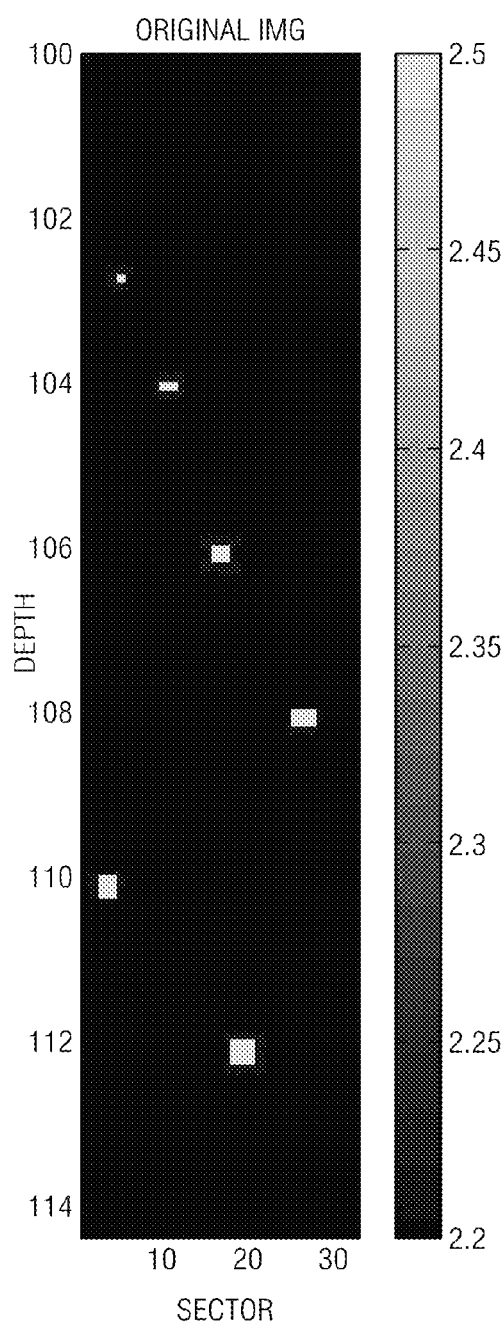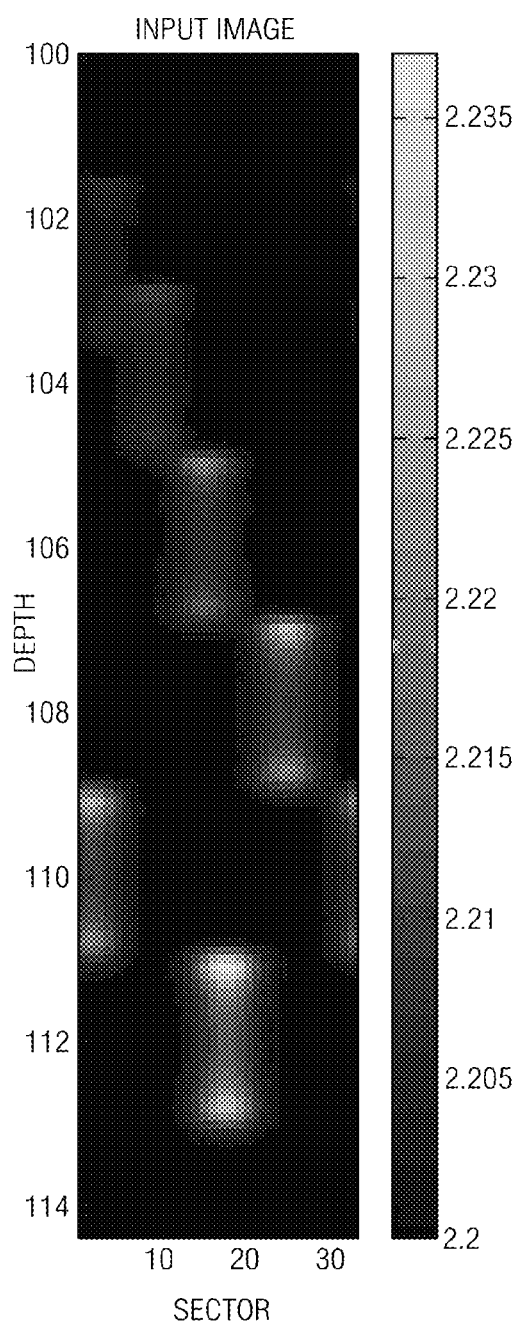
FIG. 4A                    FIG. 4B

BOREHOLE IMAGE RECONSTRUCTION USING INVERSION AND TOOL SPATIAL SENSITIVITY FUNCTIONS

RELATED APPLICATIONS

This application claims the benefit of U.S. Provisional Application Ser. No. 61/353,289 entitled Borehole Image Reconstruction using Inversion and Tool Spatial Sensitivity Functions, filed Jun. 10, 2010.

FIELD OF THE INVENTION

The present invention relates generally to borehole imaging of subterranean formations either while drilling or after drilling. In particular, this invention relates to a method for enhancing borehole images using inversion and tool spatial sensitivity functions.

BACKGROUND OF THE INVENTION

Wireline imaging (WLI) and imaging while drilling (IWD) techniques are well known in oil and gas well drilling applications. For example, a density IWD tool may obtain formation density measurements and toolface measurements at some predetermined time interval (e.g., 10 milliseconds) while rotating in the borehole during a drilling operation. A density image may then be constructed from these measurements using known imaging algorithms. Other known wireline imaging and IWD techniques include, for example, gamma, neutron, resistivity, microresistivity, sonic, ultrasonic, and caliper imaging techniques.

For the purposes of this disclosure, a borehole image may be thought of as a two-dimensional representation of a measured formation (or borehole) parameter at discrete azimuths (toolface angles) and borehole depths. Such borehole images thus tend to convey the dependence of the measured formation (or borehole) parameter on the borehole azimuth and depth. It will therefore be appreciated that one purpose in forming images of particular formation or borehole parameters (e.g., formation resistivity, density, acoustic velocity, dielectric constant, etc.) is to determine the actual azimuthal dependence of such parameters as a function of the borehole depth.

Borehole images are generally blurry to some extent. Such image distortion results from many factors. For example, blurriness is often the result of the finite distance between a source (or transmitter) and a corresponding detector. Increasing the distance between the source and the detector increases the formation volume that contributes to the measurements and therefore also tends to increase blurriness. Moreover, certain WLI and IWD measurements are statistical in nature. Rapid rotation and short measurement times tend to exaggerate the measurement noise. Vertical and azimuthal averaging routines are commonly applied to reduce such noise. These averaging routines also tend to increase image blur.

The above described image blur tends to compromise the interpretative value of borehole images. For example, smaller geological features such as thin beds, fractures, vugs, fossils, bioturbation, and the like often cannot be adequately identified and/or measured due to the blurriness of conventional IWD images. Therefore, there exists a need in the art for improved borehole imaging techniques and in particular techniques that improve the quality and interpretive value of the obtained borehole images.

SUMMARY OF THE INVENTION

Exemplary aspects of the present invention are intended to address the above described need for improved borehole imaging methodologies. In one exemplary embodiment of the invention, a borehole image (e.g., acquired during a logging while drilling operation) is processed in combination with a two-dimensional spatial sensitivity function of the imaging tool to obtain a reconstructed image. The sensitivity function typically takes into account at least one of numerous factors including, for example, the underlying physical properties governing operation of the imaging tool, the geometrical configuration of the imaging tool and the configuration of the imaging sensor. The reconstructed image tends to advantageously improve image quality, resulting in an image that more accurately represents actual formation properties.

In one aspect the present invention includes a method for reconstructing a borehole image. The method includes determining a spatial sensitivity function for a borehole imaging tool and using the imaging tool to obtain a borehole image of a subterranean formation. A reconstructed image is then computed from the borehole image and the spatial sensitivity function.

In another aspect the present invention includes a method for reconstructing a borehole image. The method includes determining a spatial sensitivity function for a borehole imaging tool and using the imaging tool to obtain a borehole image of a subterranean formation. A reconstructed image is then computed from the borehole image and the spatial sensitivity function according to at least one of the following mathematical equations:

$$A \cdot X = B; \text{ and}$$

$$f(X) = B$$

wherein $A \cdot X$ represents a linear convolution of A and X, A represents a two-dimensional spatial sensitivity function in two-dimensional matrix form, B represents the obtained borehole image, X represents the reconstructed image, and f represents an analytical or numerical spatial sensitivity function and relates sensitivity values of the imaging tool to azimuth and measured depth.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIGS. 4A, 4B, and 4C depict synthetic density images processed in accordance with the present invention.

DETAILED DESCRIPTION

Figure 1:
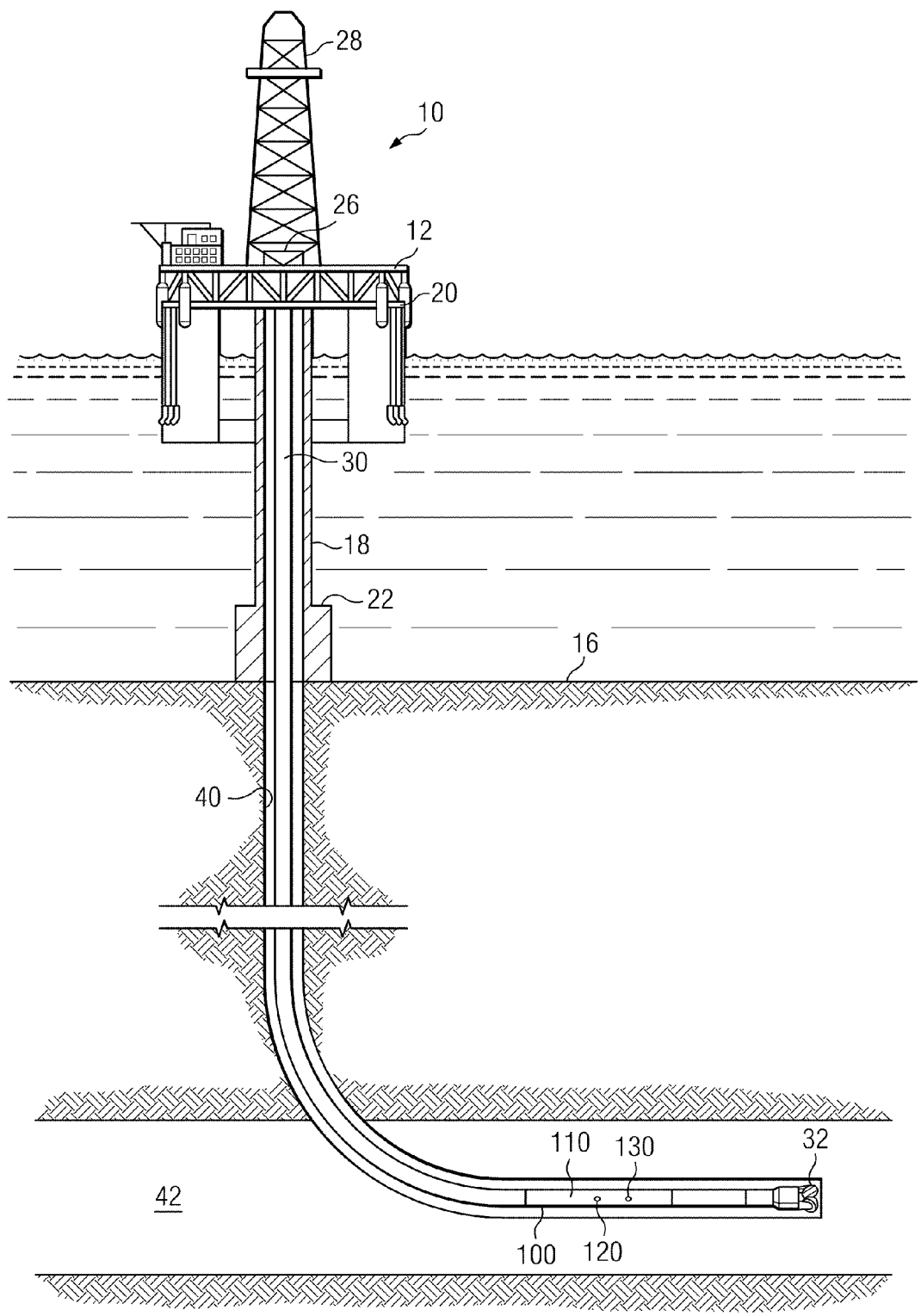
FIG. 1 depicts a conventional drilling rig on which exemplary embodiments of the present invention may be utilized.

FIG. 1 depicts one exemplary embodiment of a density imaging tool 100 (e.g., the PathFinder® ISDNSC tool) in use in an offshore oil or gas drilling assembly, generally denoted 10. In FIG. 1, a semisubmersible drilling platform 12 is positioned over an oil or gas formation 42 disposed below the sea floor 16. A subsea conduit 18 extends from deck 20 of platform 12 to a wellhead installation 22. The platform may include a derrick and a hoisting apparatus for raising and lowering the drill string 30, which, as shown, extends into borehole 40 and includes a drill bit 32 and IWD tool 100. Drill string 30 may further include, for example, a downhole drill motor, a mud pulse telemetry system, a steering tool, and/or one or more of numerous other MWD and LWD sensors for sensing downhole characteristics of the borehole and the surrounding formation. The invention is not limited in regards to these additional tool and/or sensor deployments.

It will be understood by those of ordinary skill in the art that the deployment depicted on FIG. 1 is merely exemplary for purposes of describing the invention set forth herein. It will be further understood that methods in accordance with the present invention are not limited to use with a semisubmersible platform 12 as illustrated on FIG. 1. The invention is equally well suited for use with any kind of subterranean drilling operation, either offshore or onshore. Nor is the invention limited to imaging while drilling or logging while drilling applications, but may also pertain to wireline imaging applications. Moreover, while FIG. 1 depicts a density imaging tool 100, it will be understood that the invention is not limited to the use of any particular WLI or IWD tool or to images of any particular formation or borehole property. The inventive method may utilize substantially any suitable WLI or IWD tool, including for example, gamma, neutron, resistivity, microresistivity, sonic, ultrasonic, and caliper imaging tools.

With continued reference to FIG. 1, density IWD tool 100 is depicted as being deployed in an oil and/or gas bearing formation 42 (e.g., a payzone). In the embodiment depicted, IWD tool 100 includes a gamma ray source 120 (such as a Cesium 137 source) deployed in a logging while drilling tool body 110. The gamma ray source 120 is longitudinally spaced from at least one detector 130, for example, including a sodium iodide photomultiplier assembly. Those of skill in the art will appreciate that density LWD tools commonly include first and second longitudinally spaced detectors. The invention is not limited in this regard.

While not depicted on FIG. 1, it will be understood that IWD tool 100 may further include, for example, a stand-off or caliper sensor for determining the standoff between detector 130 and the borehole wall and/or the borehole cross sectional shape. Such standoff and/or caliper sensors are known in the art and commonly include one or more ultrasonic sensors. IWD tool 100 typically further includes (or is in electronic communication with) an azimuth sensor (not shown) configured to measure the azimuth angle (toolface angle) of detector 130 in substantially real time during drilling (e.g., at intervals of 10 milliseconds or less). Suitable azimuth sensors typically include one or more accelerometers and/or magnetometers and are well known in the art. Those of ordinary skill in the art will appreciate that azimuth sensors are commonly utilized in imaging while drilling applications. It will be understood that the invention is not limited to any particular azimuth, standoff, or caliper sensor configuration or even to the use of these additional sensors.

Figure 2:
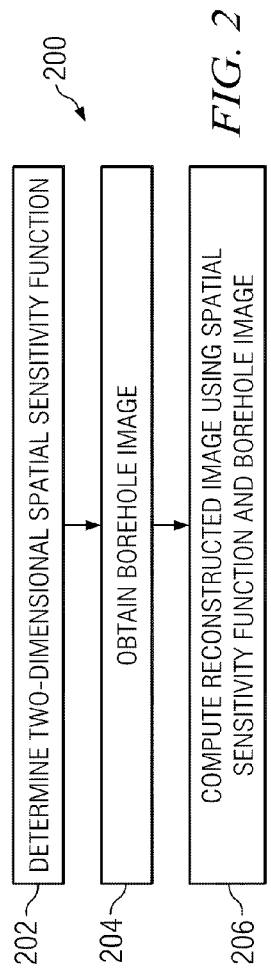
FIG. 2 depicts a flow chart of one exemplary method embodiment in accordance with the present invention.

FIG. 2 depicts a flowchart of one exemplary method embodiment 200 in accordance with the present invention. A two-dimensional spatial sensitivity function is determined for a particular borehole imaging tool at 202. The borehole imaging tool is utilized to obtain a two-dimensional borehole image at 204. A reconstructed image is then computed from the spatial sensitivity function and the original image at 206. It will be understood that steps 202 and 204 are not performed in any particular order. The sensitivity function may be determined in 202 either before or after (or concurrently with) image acquisition in 204.

The spatial sensitivity function determined at 202 is preferably represented by a two-dimensional matrix of imaging tool sensitivity values. The spatial sensitivity function may be determined, for example, using mathematical modeling techniques such as finite element analysis and/or differential equation modeling. Statistical simulations, such as a Monte Carlo simulation, and experimental measurements may also be utilized to determine the spatial sensitivity function.

A suitable spatial sensitivity function typically depends on many factors. These factors may include, for example, the underlying physical principles governing tool operation (e.g., electromagnetic wave propagation vs. sonic wave propagation vs. particle scattering), the tool configuration (e.g., tool diameter, source location, detector location, and source to detector spacing), and the sensor configuration (e.g., shielding, materials of construction, and sensitivity). While the invention is not limited in these regards, these factors are listed above in an approximate order of importance. The underlying physical principles may be thought of as a first order effect, the tool configuration as a second order effect, and the sensor configuration and materials of construction as a third order effect. Tool to tool variation (i.e., within a common serial number) may also be considered and may be thought of as a fourth order effect. Such tool to tool variation is typically determined via laboratory measurements.

Figure 3:
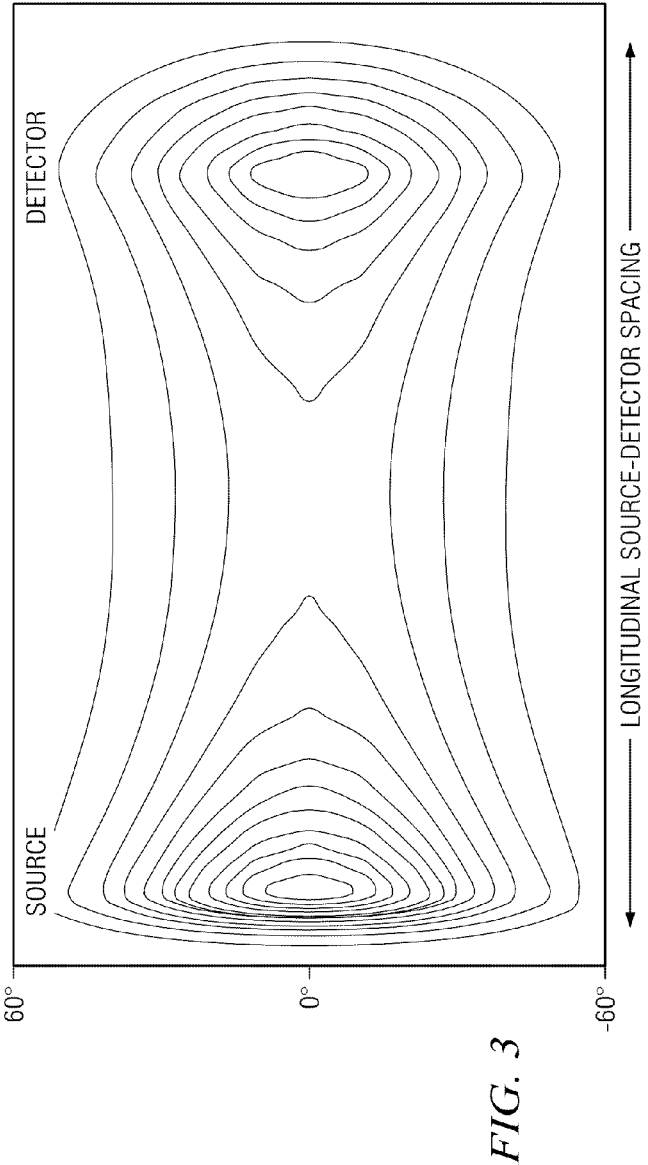
FIG. 3 depicts one exemplary embodiment of a two-dimensional spatial sensitivity function of the density imaging tool depicted on FIG. 2.

FIG. 3 depicts one exemplary embodiment of a spatial sensitivity function suitable for use with the present invention. The depicted sensitivity function was derived for an exemplary density LWD tool embodiment including a single source and a single detector (e.g., as depicted on FIG. 1). The invention is by no means limited in this regard. The exemplary embodiment shown on FIG. 3 is depicted as a two-dimensional contour plot. In the depicted embodiment, the vertical (y-) axis represents the azimuth angle from −60 to 60 degrees about the circumference of the tool with the sensor being located at an azimuth of 0 degrees. The horizontal (x-) axis represents the measured depth along the longitudinal axis of the tool (the relative axial positions of the source and sensor in the exemplary embodiment depicted). The contours represent values of the sensitivity function at the discrete azimuth and depth locations. The contours may then be represented as a two-dimensional matrix of sensitivity values. In the exemplary embodiment depicted the formation close to the source and detector has a higher influence in the measurement reading (and therefore a higher sensitivity value), while the formation axially between the source and detector tends to have less influence on the measurement (and therefore a lower sensitivity value). The formation on the back side of the tool also tends to have minimal influence on the measurement and therefore a sensitivity value near or equal to zero. Moreover, the sensitivity function of the tool may vary with the properties of the formation. In such instances it may be necessary to select from multiple candidate sensitivity functions for a single tool. It will also be understood that the sensitivity function need not be restricted to a two-dimensional array. For example, the sensitivity function may also take the form of complex mathematical functions which are based on the sensitivity function(s) and relate the sensitivity values to the azimuth and/or measured depth of the sensor.

It will be understood that methods in accordance with the present invention may be applied to substantially any suitable LWD and wireline borehole image. These images may be acquired at the surface at 204, for example, in real time during drilling or from memory after the LWD tool has been tripped out of the well or during a wireline trip. The logging tool can create the image using rotational measurement (e.g., rotation of the drill string) or with rotationally stationary pads. Suitable borehole images may be constructed using substantially any known methodologies, for example, including conventional binning, windowing, and probability distribution algorithms as well as by harmonic representations. U.S. Pat. No. 5,473,158 discloses a conventional binning algorithm for constructing a borehole image. Commonly assigned U.S. Pat. No. 7,027,926 to Haugland discloses a windowing algorithm in which sensor data is convolved with a one-dimensional window function. Commonly assigned U.S. Pat. No. 7,558,675 to Sugiura discloses an image constructing technique in which sensor data is probabilistically distributed in either one or two dimensions. Commonly assigned, co-pending U.S. Patent Publication 2010/0286916 to Wang discloses a technique in which directional resistivity sensor data is processed to obtain first order harmonic representations. Other imaging techniques may also be utilized. For example, commonly assigned, co-pending U.S. patent application Ser. No. 12/651,040 to Wang discloses a technique in which sensor measurements residing in each of a plurality of azimuthal windows are fit with corresponding mathematical fitting functions. Again, it will be understood that the invention is expressly not limited to any particular technique for obtaining a borehole image from the LWD sensor measurements.

With reference again to the flowchart depicted on FIG. 2, the reconstructed image may be computed at 206 via solving a two-dimensional linear convolution problem, which may be represented mathematically, for example, as follows:

$$A \cdot X = B \quad \text{Equation 1}$$

where $A \cdot X$ represents a linear convolution of a two-dimensional sensitivity function A in two-dimensional matrix form (e.g., as determined at 202) and the reconstructed borehole image X computed in accordance with the present invention (e.g., at 206) and B represents a two-dimensional borehole image (e.g., as obtained at 204). The reconstructed image X may be solved from over-determined equations using classical linear inversion methods or non-linear inversion methods with or without constraints. Regularization methods may also be employed. It will also be understood that Equation 1 may be expressed in a more general form, for example, as follows:

$$f(X) = B \quad \text{Equation 2}$$

where the function $f$ is typically a non-linear analytical or numerical function based on the imaging tool sensitivity function(s) and relates sensitivity values of the imaging tool to the azimuth and/or measured depth of the sensor and X and B are as defined above.

Figure 4C:
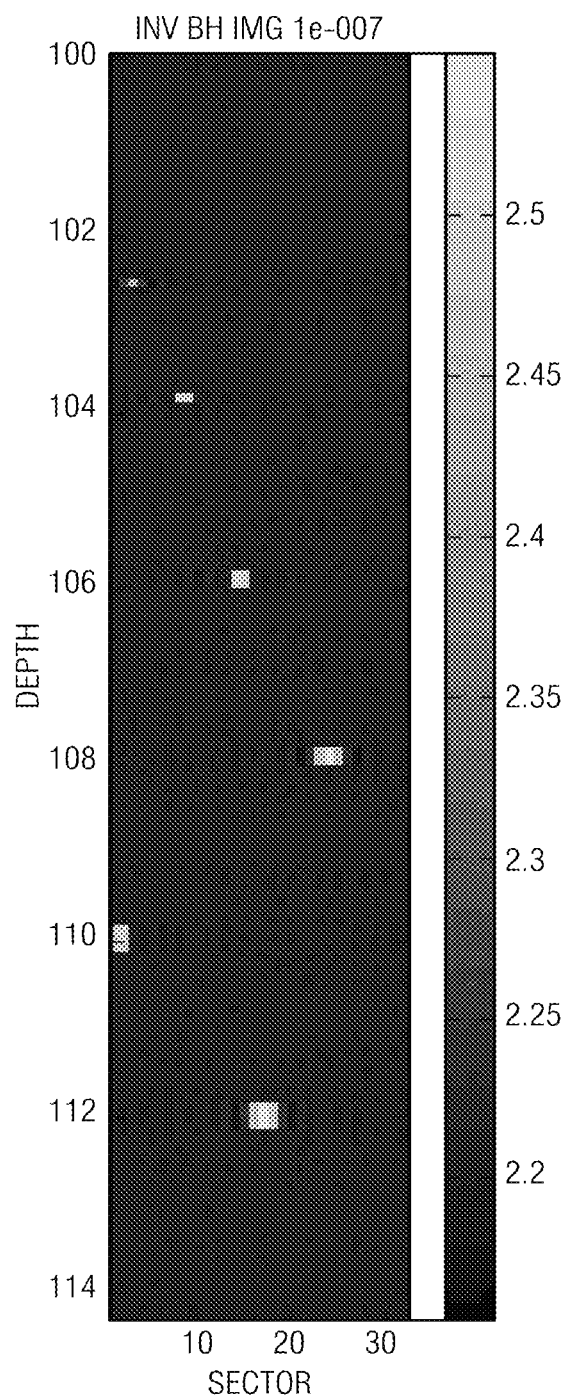

The present invention is now described in further detail by way of the following examples, which are intended to be purely exemplary of the present invention and should not be construed as in any way limiting in its scope. FIGS. 4A-4C (collectively FIG. 4) depict density images of a hypothetical formation. FIG. 4A is representative of the actual formation densities of the hypothetical formation. The hypothetical formation includes six discrete regions of high density (2.5 g/cm$^3$) located in a low density matrix (2.2 g/cm$^3$). The discrete regions are of varying sizes ranging from a single pixel (upper left) up to a 3×3 pixel grid (lower right). FIG. 4B depicts a hypothetical borehole image (B in Equations 1 and 2) obtained using a conventional density LWD tool. The discrete regions are vertically blurred with a loss of contrast owing in large part to the vertical separation between the source and detector. FIG. 4C depicts a reconstructed image obtained in accordance with the present invention using an exemplary spatial sensitivity function similar to that depicted on FIG. 3. The reconstructed image is similar to the actual formation properties shown on FIG. 4A. Moreover, the density values in the reconstructed image are nearly equal to those given on FIG. 4A indicating that the present invention tends to significantly improve borehole image quality (both qualitative and quantitative) as compared with FIG. 4B.

Figures 5A, 5B:
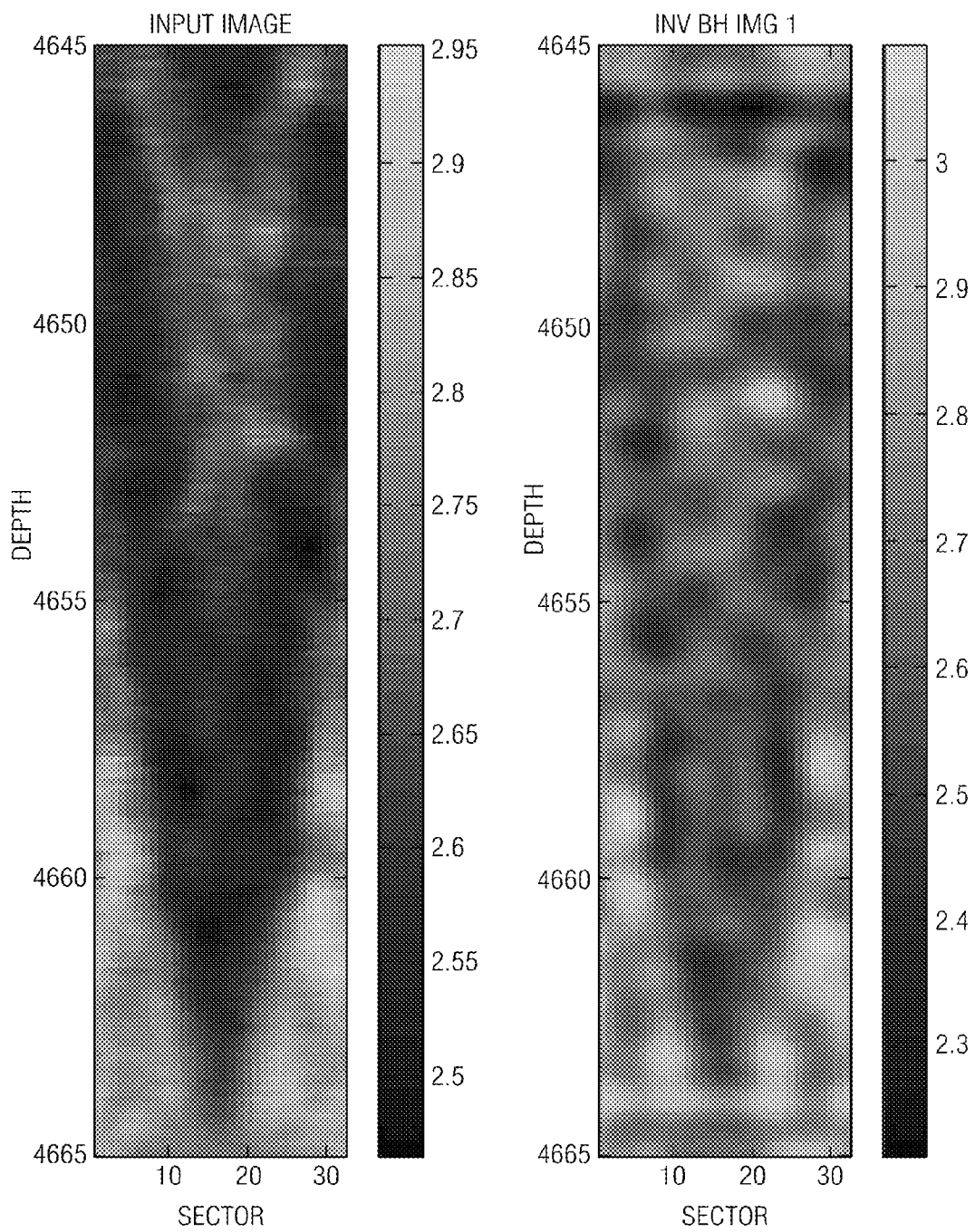
FIGS. 5A and 5B depict field density images processed in accordance with the present invention.

FIGS. 5A and 5B (collectively FIG. 5) depict actual density images of a subterranean formation. FIG. 5A depicts a density LWD image (B in Equations 1 and 2) for a portion of a subterranean drilling operation. The depicted image includes 32 azimuthal sectors and 200 vertical stripes (each stripe representing a depth interval of 0.1 feet). As will be understood by those of skill in the art, the density image depicts a low density bed located above a higher density formation. FIG. 5B depicts a reconstructed image obtained in accordance with the present invention using an exemplary spatial sensitivity functions similar to that depicted on FIG. 3. The reconstructed density image depicted on FIG. 5B clearly shows improved contrast and a sharper bed boundary again indicating that the present invention may significantly improve borehole image quality. This improvement may be further enhanced with a better characterized tool sensitivity function.

Although the present invention and its advantages have been described in detail, it should be understood that various changes, substitutions and alternations can be made herein without departing from the spirit and scope of the invention as defined by the appended claims.

I claim:

1. A method for reconstructing a borehole image, the method comprising:
   (a) determining a spatial sensitivity function for a borehole imaging tool;
   (b) using the borehole imaging tool to obtain a borehole image of a subterranean formation; and
   (c) computing a reconstructed image from the borehole image obtained in (b) and the spatial sensitivity function determined in (a) according to the following mathematical equation:

$$A \cdot X = B$$

wherein $A \cdot X$ represents a linear convolution of A and X, A represents a two-dimensional spatial sensitivity function in two-dimensional matrix form as determined in (a), B represents the borehole image obtained in (b), and X represents the reconstructed image.

2. The method of claim 1, wherein the reconstructed image X is computed using linear or non-linear inversion methods.

3. The method of claim 1, wherein (i) the borehole imaging tool is an imaging while drilling tool and (ii) the borehole image is obtained in (b) while drilling the borehole.

4. The method of claim 1, wherein the borehole imaging tool is selected from the group consisting of gamma, neutron, resistivity, microresistivity, sonic, ultrasonic, and caliper imaging tools.

5. The method of claim 1, wherein the sensitivity function determined in (a) comprises at least first order and second order effects, the first order effects including underlying physical principles governing operation of the imaging tool and the second order effect including a geometric configuration of the imaging tool.

6. The method of claim 5, wherein the second order effects comprise at least one of an imaging tool diameter, a source location on the imaging tool, a detector location on the imaging tool, and a source to detector spacing.

7. The method of claim 5, wherein the sensitivity function further comprises a third order effect, the third order effect including a sensor configuration of the imaging tool.

8. The method of claim 7, wherein the third order effect comprises at least one of a sensor shielding configuration, materials of construction of the imaging tool, and a detector sensitivity.

9. The method of claim 7, wherein the sensitivity function further comprises a fourth order effect, the fourth order effect including tool to tool variation.

10. A method for reconstructing a borehole image, the method comprising:
   (a) determining a spatial sensitivity function for a borehole imaging tool;
   (b) using the borehole imaging tool to obtain a borehole image of a subterranean formation; and
   (c) computing a reconstructed image from the borehole image obtained in (b) and the spatial sensitivity function determined in (a) according to the following mathematical equation:

$$f(X)=B$$

wherein f represents the spatial sensitivity function determined in (a) and relates sensitivity values of the imaging tool to azimuth and measured depth, B represents the borehole image obtained in (b), and X represents the reconstructed image.

11. The method of claim 10, wherein (i) the borehole imaging tool is an imaging while drilling tool and (ii) the borehole image is obtained in (b) while drilling the borehole.

12. The method of claim 10, wherein the spatial sensitivity function comprises a two-dimensional matrix of sensitivity values.

13. The method of claim 10, wherein the spatial sensitivity function comprises a non-linear function relating sensitivity values to sensor azimuth and measured depth.

14. The method of claim 10, wherein the spatial sensitivity function is determined in (a) using at least one of mathematical modeling techniques, statistical simulations, and experimental measurements.

15. The method of claim 10, wherein the sensitivity function determined in (a) comprises at least first order and second order effects, the first order effects including underlying physical principles governing operation of the imaging tool and the second order effect including a geometric configuration of the imaging tool.

16. The method of claim 15, wherein the second order effects comprise at least one of an imaging tool diameter, a source location on the imaging tool, a detector location on the imaging tool, and a source to detector spacing.

17. The method of claim 15, wherein the sensitivity function further comprises a third order effect, the third order effect including a sensor configuration of the imaging tool.

18. The method of claim 17, wherein the third order effect comprises at least one of a sensor shielding configuration, materials of construction of the imaging tool, and a detector sensitivity.

19. The method of claim 17, wherein the sensitivity function further comprises a fourth order effect, the fourth order effect including tool to tool variation.

20. The method of claim 10, wherein the borehole imaging tool is selected from the group consisting of gamma, neutron, resistivity, microresistivity, sonic, ultrasonic, and caliper imaging tools.

* * * * *